Feb. 13, 1923.

E. F. REEVES.
EGG CONTAINER.
FILED FEB. 2, 1921.

1,445,171.

INVENTOR
Edwin F Reeves

BY
Miller & Henry
ATTORNEYS

Patented Feb. 13, 1923.

1,445,171

UNITED STATES PATENT OFFICE.

EDWIN F. REEVES, OF SAN FRANCISCO, CALIFORNIA, ASSIGNOR TO NATIONAL EGG CASE COMPANY, OF RENO, NEVADA, A CORPORATION OF NEVADA.

EGG CONTAINER.

Application filed February 2, 1921. Serial No. 441,762.

*To all whom it may concern:*

Be it known that I, EDWIN F. REEVES, a citizen of the United States, and resident of the city and county of San Francisco, State of California, have invented new and useful Improvements in Egg Containers, of which the following is a specification.

My invention has for its object a package or container in which eggs may be safely packed and shipped without the usual breakage. A further object is the production of such a package which will be suitable for frequent or continuous use and one which may be cheaply constructed and quickly assembled.

These objects I attain by a structure of paper or cardboard or the like whereby a series of cells are formed between the several members of the structure and into which the eggs are placed. The walls of the said cells are formed with the requisite stiffness or supporting power to safely carry the egg under the varying conditions of transport and at the same time to provide sufficient elasticity in the walls, tops and bottoms to prevent breakage of the said egg, incident to a blow or jar.

This cellular structure I assemble within a container or box, the outer walls of which are preferably made of corrugated strawboard or the like, thus providing an outer protective armor of the requisite stiffness and thickness to safely protect the cellular structure and eggs contained therein.

By referring to the accompanying drawings my invention will be made clear.

Throughout the figures similar numerals refer to identical parts.

Figure 1:
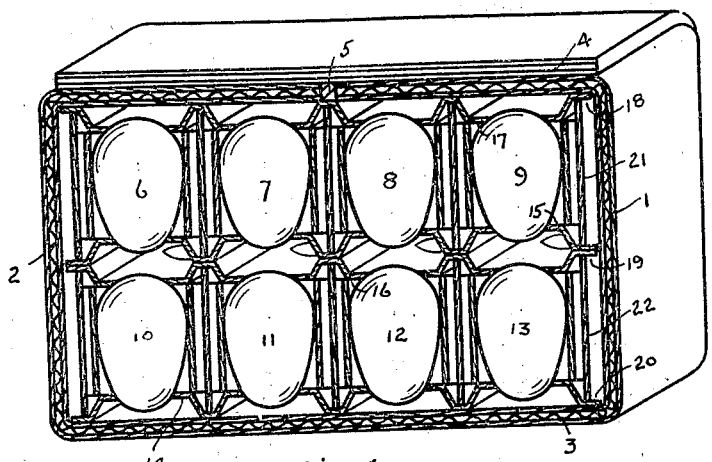
Figure 1 illustrates the completed container in elevation and represents a cross section through the center thereof as on the line I—I of Figure 2.
Figure 3:
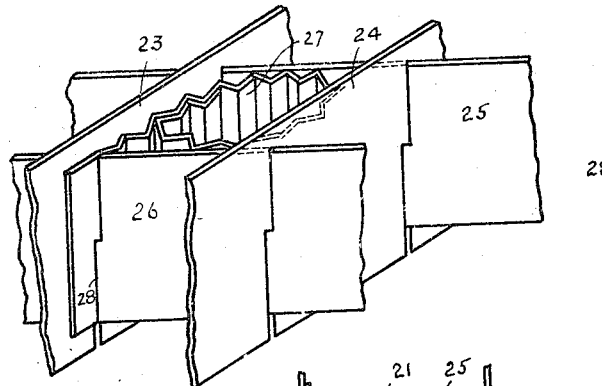
Fig. 3 represents in detail a single cell formed by the partition members.
Figure 5:
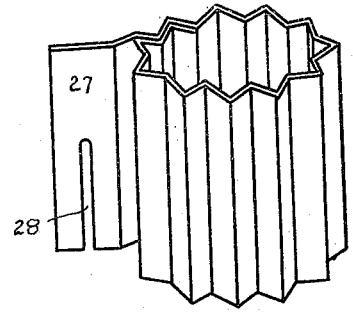
Fig. 5 is a perspective detail of the expansible strip which I employ in the individual cells.
Figure 4:
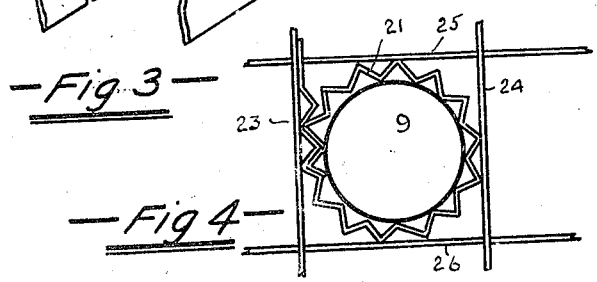
Fig. 4 is a plan view of Fig. 3 with an egg in place.

The box, package or container illustrated in Fig. 1 is adapted to contain two dozen eggs arranged in two tiers of one dozen each; and for each egg is provided a cell as indicated in Figures 3 and 4, which cell is lined with an expansible strip as indicated in Fig. 5 by dovetailing the slot 28 over the member 26. Each egg in both tiers rests upon a bottom member consisting of a folded strip 15 supported by folds at 19 from contact strips so that a flexible bottom support is provided for the egg and a similar top member which is formed the same as said bottom member but reverse in position so that their corresponding contact strips are adjacent to each other as at 19.

Figure 2:
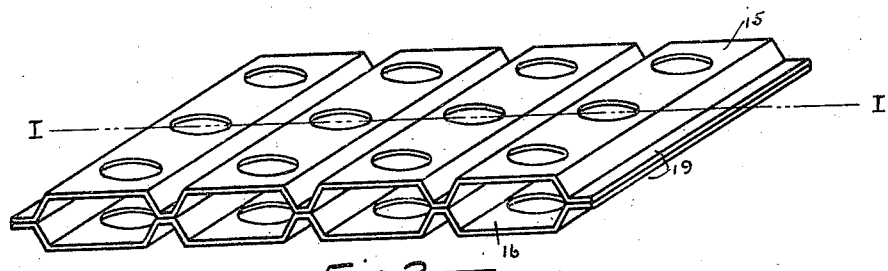
Fig. 2 represents an assembled bottom partition for the upper tier and top partition for the lower tier of Fig. 1.

This structure is shown in detail in Fig. 2, it being understood that a top and bottom member is provided for each tier and the bottom member of the upper tier is assembled with the top member of the lower tier in manner shown in Fig. 2, whereas the top member of the upper tier is represented by the lower sheet of Fig. 2 and the bottom member of the lower tier is represented by a sheet similar to the upper sheet of Fig. 2.

In this way it will be seen that the box of Fig. 1 may be inverted and in either position the eggs are supported elastically by the folds of the sheet containing the punched out holes for receiving their eggs.

In the Figure 1 the sides of the box are indicated by the numerals 1 and 2, the bottom and top by numerals 3 and 4, respectively, the latter being shown folded over in double thickness to cover the joint of the side flaps as shown at 5. The eggs are shown at 6, 7, 8, 9, 10, 11, 12, 13; 6 to 9 being a row in the upper tier and 10 to 13 a row in the lower tier. Bottom supporting members consisting of folded strips of cardboard or the like, suitably punched for receiving one end of each egg are shown at 14 and 15, and top members of identical form but in reverse position are shown at 16 and 17. These are folded and supported from contact strips as 18, 19, 20 which contact strips are in turn supported by the partition members as 21 and 22.

The partitions 23, 24, 25, 26 which form the walls of the cells are preferably dovetailed together in the well known way as illustrated in perspective view Fig. 3 and within the dovetail at 28 formed between two adjacent walls I insert the folded strip 27. It will be noted that the folds in this strip are made longitudinally with the axis of the egg so that it forms an accordian pleated lining for the cell within which eggs of various sizes will be held by the said accordian pleats from any moving about therein.

It will thus be seen that the container of Fig. 1 provides two dozen cells each containing an expansible strip 27; and bottom supporting spring members 14, 15 and top holding spring members 16, 17; also outer cell walls offering compression and tension support from cross trussing through the entire package as at 23, 24, 25 and 26 and form also supports and spacing members for the contact strips as 18, 19 and 20; and around all is an outer protecting casing as indicated by the walls 1, 2, 3 and 4, forming a complete egg container or package.

Reference is herein directed to my co-pending application Ser. 521,980, filed Dec. 13, 1921.

I claim:

1. A package for shipping and handling eggs comprising a plurality of partitions intercrossing to form cell walls, parallel contact strips supported by said partitions, a top and a bottom member of relatively reversed form, recessed for receiving egg ends and bent away from said contact strips, and an expansible filler for each cell engaged with the wall of said cell.

2. The combination of a plurality of horizontally arranged members each consisting of a flat portion and portions raised above the flat portion, and having therein egg receiving openings with imperforate edges one of said horizontally arranged members placed below and one above each layer of eggs and the upper and lower portions of the eggs being located in said openings, and vertically arranged spacing and supporting members between the raised portions, said last named members extending from one to the other of said horizontally arranged members and spacing and supporting them, and expansible strips engaged with said vertical members and adapted to individually wrap the eggs.

EDWIN F. REEVES.